(12) United States Patent
Youssefmir et al.

(10) Patent No.: US 8,719,879 B2
(45) Date of Patent: May 6, 2014

(54) METHOD AND APPARATUS FOR CONTENT DELIVERY

(75) Inventors: Michael Youssefmir, Portola Valley, CA (US); James Vincent Burmeister, Tamarac, FL (US); Philip R. Wiser, Nevada City, CA (US); Blair Leavell, Weston, FL (US); Michael W. Brown, Plantation, FL (US)

(73) Assignee: Kuautli Media Investment ZRT., Budapest (HU)

( * ) Notice: Subject to any disclaimer, the term of this patent is extended or adjusted under 35 U.S.C. 154(b) by 368 days.

(21) Appl. No.: 13/117,996

(22) Filed: May 27, 2011

(65) Prior Publication Data

US 2011/0307929 A1     Dec. 15, 2011

Related U.S. Application Data

(60) Provisional application No. 61/354,028, filed on Jun. 11, 2010.

(51) Int. Cl.
*H04N 7/173* (2011.01)

(52) U.S. Cl.
USPC ............................... 725/89; 725/94; 725/134

(58) Field of Classification Search
USPC ............ 725/86–89, 91, 93, 94, 100; 709/217, 709/219
See application file for complete search history.

(56) References Cited

U.S. PATENT DOCUMENTS

| | | |
|---|---|---|
| 5,933,605 A | 8/1999 | Kawano et al. |
| 6,040,829 A | 3/2000 | Croy et al. |
| 6,216,141 B1 | 4/2001 | Straub |
| 6,637,029 B1 | 10/2003 | Maissel et al. |
| 6,698,020 B1 | 2/2004 | Zigmond et al. |
| 6,774,864 B2 | 8/2004 | Evans et al. |
| 6,975,301 B2 | 12/2005 | Fan |
| 7,024,156 B2 | 4/2006 | Kawamata et al. |
| 7,036,139 B2 | 4/2006 | Aras |
| 7,170,420 B2 | 1/2007 | Phifer |

(Continued)

FOREIGN PATENT DOCUMENTS

| | | |
|---|---|---|
| EP | 0804012 | 10/1997 |
| EP | 1041824 | 10/2000 |

(Continued)

OTHER PUBLICATIONS

International Search Report for PCT/US2008/014041.

(Continued)

*Primary Examiner* — Ngoc Vu
(74) *Attorney, Agent, or Firm* — Notaro, Michalos & Zaccaria P.C.

(57) ABSTRACT

A method for recording linear content and delivering it for time-shifted viewing is described. The linear content may be recorded live by the content delivery system in response to user requests. The content delivery system divides the recording into at least two portions, the first portion of sufficient duration to permit real time continuous playback of the recorded content on the customer premises equipment (CPE) if the first portion has previously been transmitted to the CPE and the second has not been transmitted. The content delivery system transmits the first portion to the CPE prior to playback, and the second portion is streamed to the CPE after playback has begun. The playback is under control of the CPE from local storage.

21 Claims, 4 Drawing Sheets

(56) References Cited

U.S. PATENT DOCUMENTS

| | | | |
|---|---|---|---|
| 7,295,253 | B1 | 11/2007 | Gerstman |
| 7,352,414 | B2 | 4/2008 | Lee |
| 7,363,569 | B2 | 4/2008 | Pendakur et al. |
| 7,423,662 | B2 | 9/2008 | Unger |
| 7,432,990 | B2 | 10/2008 | Borden, IV et al. |
| 7,567,565 | B2 | 7/2009 | La Joie |
| 7,869,783 | B2 | 1/2011 | Morton |
| 7,917,008 | B1* | 3/2011 | Lee et al. ............. 386/291 |
| 7,917,925 | B2 | 3/2011 | Eigeldinger |
| 7,992,185 | B2 | 8/2011 | Kanda |
| 8,281,352 | B2 | 10/2012 | Brooks et al. |
| 2002/0059588 | A1 | 5/2002 | Huber et al. |
| 2002/0144262 | A1 | 10/2002 | Plotnick et al. |
| 2002/0184626 | A1 | 12/2002 | Darbee et al. |
| 2003/0177247 | A1* | 9/2003 | Dunning et al. ........ 709/228 |
| 2004/0003400 | A1 | 1/2004 | Carney et al. |
| 2004/0172650 | A1 | 9/2004 | Hawkins et al. |
| 2004/0250273 | A1 | 12/2004 | Swix et al. |
| 2005/0026690 | A1 | 2/2005 | Silver |
| 2005/0114794 | A1 | 5/2005 | Grimes et al. |
| 2005/0183120 | A1* | 8/2005 | Jain et al. ............. 725/46 |
| 2005/0235307 | A1 | 10/2005 | Relan et al. |
| 2005/0246738 | A1 | 11/2005 | Lockett |
| 2006/0026302 | A1 | 2/2006 | Bennett et al. |
| 2006/0031880 | A1 | 2/2006 | Stark et al. |
| 2006/0037057 | A1* | 2/2006 | Xu ...................... 725/90 |
| 2006/0150120 | A1 | 7/2006 | Dresti |
| 2007/0266414 | A1 | 11/2007 | Kahn et al. |
| 2007/0294717 | A1 | 12/2007 | Hill et al. |
| 2008/0066106 | A1 | 3/2008 | Ellis et al. |
| 2008/0127227 | A1 | 5/2008 | Kuschak |
| 2008/0235746 | A1 | 9/2008 | Peters et al. |
| 2009/0276815 | A1* | 11/2009 | Casagrande ............ 725/87 |

FOREIGN PATENT DOCUMENTS

| | | |
|---|---|---|
| WO | WO01/52537 | 7/2001 |
| WO | WO02/097611 | 12/2002 |
| WO | WO2004/057874 | 7/2004 |
| WO | WO2006/011796 | 3/2006 |
| WO | WO2007/068290 | 6/2007 |
| WO | WO2008/127737 | 10/2008 |
| WO | WO2009/038829 | 3/2009 |

OTHER PUBLICATIONS

International Search Report for PCT/US2008/004922.
International Search Report for PCT/US2008/012418.
Appeal Decision of EP08865944.6.
European Search Report EP 12 159 533.4.
Opinion of EP 08865944.6.
Rejection of EP 08 831 750.8.
U.S. Appl. No. 13/183,512 Office Action.
U.S. Appl. No. 12/819,001 Office Action.
International Search Report Opinion PCT/US2008/004922.
International Search Report Opinion PCT/US2008/014014.
International Search Report Opinion PCT/US2008/014041.
International Search Report Opinion PCT/US2008/065429.
International Preliminary Report PCT/2008/014014.
International Preliminary Report PCT/US2008/004922.
International Preliminary Report PCT/US2008/012418.
International Preliminary Report PCT/US2008/014041.
International Preliminary Report PCT/US2008/065429.
International Search Report PCT/US2008/065429.

* cited by examiner

METHOD AND APPARATUS FOR CONTENT DELIVERY

STATEMENT OF RELATED CASES

This application claims priority from provisional application 61/354,028, filed Jun. 11, 2010.

BACKGROUND

1. Field

This disclosure is generally related to content delivery systems. More specifically, this disclosure is related to providing a user-directed, network-hosted content recording system with local playback with minimal latency.

2. Related Art

A number of consumer electronics products allow individuals to capture audiovisual content such as over the air television programming, live cable programming, live satellite programming, and the like for later viewing. These devices are commonly referred to as personal video recorders (PVRs) or digital video recorders (DVRs). In general, the recording and storage of content occurs at the location of the device, typically a consumer's home. More recently, cable companies have begun offering network DVRs (nDVRs) and remote storage DVRs (RS-DVRs). For both offerings, the recording of the content takes place at the cable companies' premises. The difference in nomenclature sometimes refers to the number of distinct recordings made (nDVR: one recording for all requests; RS-DVR: one recording per user request.) Once recorded, the contents are played back over a dedicated channel within the cable network in a manner that is targeted for the original requester's customer premises equipment (CPE). This is sometimes called narrowcasting. The CPE can be a set top box, a cable card, or the like. Thus, in operation it is quite similar to how cable video on demand (VOD) is provided. Furthermore, as with cable VOD, playback and control, including trick play, is implemented on the server side. This, in turn, may lead to high latency in serving initial requests and/or during playback in responding to user controls. Exemplary PVRs, nDVRs and RS-DVRs include: TiVo HD, Comcast DVR, Cablevision RS-DSR, and Echostar ViP 922 DVR.

DETAILED DESCRIPTION

Overview

The discussion is organized as follows. First an introduction describing some of the problems addressed by various embodiments will be presented, followed by an explanation of terminology that will be used throughout the discussion. Then, a high-level description of one embodiment will be discussed at an architectural level. Next, an architectural view of adaptive IP streaming will be presented. Then, details of algorithms used by embodiments are discussed. Lastly, various alternative embodiments are discussed.

Traditional systems that provide a wide array of linear content, especially live television and cable stations, together with nonlinear content require a significant amount of broadcast spectrum and/or infrastructure to the home. An approach using multiple networks to provide that breadth of content while efficiently using the broadcast spectrum has been pioneered by Sezmi Corporation, see, e.g. U.S. patent application Ser. No. 12/082,954 ("Networked Antenna and Transport System Unit" filed 14 Apr. 2008), Ser. No. 12/082,955 ("Viewer Interface for a Content Delivery System" filed 14 Apr. 2008), Ser. No 12/131,009 ("Programming Content Reconstruction in a Content Delivery System" filed 30 May 2008), and Ser. No. 12/290,583 ("Remote Control Unit for a Personalized Video Programming System" filed 31 Oct. 2008), and PCT application PCT/US2008/014014 ("System for Content Delivery" filed 23 Dec. 2008).

As an example of the problem facing content delivery providers, if a customer's provider has only 20-30 Mbps of broadcast spectrum and is providing approximately 15 cable channels over that spectrum, as well as access to live over the air television content, how can the provider offer a deeper line-up of content (e.g. offering more linear content such as cable channels)? Adaptive IP streaming of additional linear cable channels can increase the depth of the line-up for live viewing of linear content. Typically, adaptive IP streaming is implemented via unicast transmission to an individual customer premises equipment (CPE) of the stream. However, adaptive IP streaming can have high bandwidth costs for the provider. Further, how can a customer request for the recording of a particular program, for example "Iron Chef America" on Food Network, be addressed?

Without additional copyright rights to the content, the provider would be required to unicast stream the cable station over IP solely to enable recording at the customer's CPE for later viewing. That stream may be wasteful of bandwidth for both the provider and the customer. This may be especially true if most customers do not watch the program until days later, or in some cases not at all. Further, given the availability of multiple transmission networks between the provider and customers, high-demand recorded content can be broadcast (as opposed to unicast streamed) to CPEs that requested the recording. Embodiments make use of predictive systems implemented by the provider to further improve bandwidth usage and will be described in greater detail infra.

For example, if a high percentage of users record "Iron Chef America" but generally do not watch it until a day later, instead of unicast streaming Food Network's linear cable feed to thousands of CPEs for individual recording, the provider can take the following action. First, the provider records the program. The provider can then broadcast the recording late that night over the private broadcast network in such a way that only CPEs that requested the recording can actually view the content. Or, more efficiently, the provider can broadcast only a first portion of the recording, until specific customers begin watching the recording—thus conserving broadcast bandwidth. The duration of that first portion can be calculated to be sufficient to allow seamless beginning-to-end playback of the content, under normal network conditions, when the second portion is unicast streamed over IP. More details about how that duration is determined will be described in greater detail infra.

Another problem exists where households with a single CPE, but multiple users have conflicting recording requests. Any CPE will have a finite amount of computational capacity, storage throughput, and tuning capacity to handle these potentially conflicting requests. Remote recording can reduce conflicts as well as bandwidth requirements to the CPE.

However, with remote recording, customers may notice increased latency in playback and playback control for remotely recorded content where the content must be streamed to them. Ideally, the customer experience should be identical whether content, e.g. "Iron Chef America" on Food Network, is recorded locally (e.g. on the CPE) or recorded at a remote location (e.g. at the provider). Specifically, the content should start in real time after the request is made (typically within 1-2 seconds) and should be playable continuously from beginning to end without interruptions due to buffering problems under normal network conditions. This provides an improved customer experience, especially for nontechnical customers who may not understand buffering. The prototypical nontechnical customer might perceive a 30-second start-up delay as their CPE crashing or hanging, or might find playback stuttering difficult to understand. Embodiments offer the capability to provide a comparable experience between local and remote recorded content, thus substantially improving the customer experience.

The continuous playback assumption is based on normal network conditions for both the household where the CPE is located and the communications channel from the provider to the CPE. If a network outage occurs, or there is a significant change in available network bandwidth and/or latency, that requirement may not be met. We describe a system and various embodiments to improve the user experience for a content delivery network.

Terminology

Throughout this specification the following terms will be used:

Content: Content refers to a discrete piece of audiovisual programming. Some content is composed of multiple pieces of content. One example would be a single 30-minute situation comedy that is a piece of content that, when broadcast free over the air, generally includes commercials. The commercials are themselves content. The entirety of the broadcast is also considered a single piece of content. The intended meaning and scope of the term "content" should be apparent from the usage.

Provider: Provider refers to the entity, or entities, offering the content and related content delivery services to customers described by embodiments discussed herein. Providers may also offer programming. The provider could be an independent entity such as Sezmi Corporation, or a company more traditionally associated with providing linear content (e.g. cable and/or satellite programming) to customers such as a telephone company, an internet service provider (ISP), a cable company, or a satellite company.

Network: The term "network" has two distinct meanings in the context of this subject. The first meaning refers to the term given to broadcast, cable and/or satellite content originators, e.g. NBC network, Bravo network, etc. The second meaning refers to a technical computer network and the interconnection of devices via communications channels to permit communication between devices. Additional ambiguity can arise because individuals have small scale, or local area networks (LAN) inside their homes. And those networks are, in turn, coupled to the broader internet via an internet service provider (ISP). In general, the term "network" as used herein in the second sense will refer to the overall connection between the provider and the customer.

Two primary networks will be discussed, the first network being a network controlled and established by the provider. This network will generally be created by the provider acquiring rights to a portion of broadcast spectrum for private use (for example, the Sezmi Corporation contracting with the local San Francisco Bay Area NBC affiliate for 10 Mbps of broadcast spectrum). Note that to implement this network Sezmi may make use of additional transmission media such as satellite uplinks and downlinks to communicate with that affiliate and create the network to the customers. Similarly, WiMax, cellular, or other broadcast spectrum could be used to provide the first network. The second network that will be discussed is an open, public network such as the internet. The communications over the internet may be encrypted and/or tunneled; however, that does not alter the public nature of the network.

Linear Content: Linear content refers to content that an originator is transmitting to a customer such that (i) it can be received and viewed in real time; and (ii) it is not possible to jump arbitrarily forward past what the originator has transmitted up to that point in time. An example of linear content is live over the air television, e.g. watching the opening ceremony of the Olympics or 30 Rock live at the time of the original transmission. If the customer records linear content for later playback ("time shifting"), when it is played back later from the full recording, the content is then considered nonlinear content. Notwithstanding that, some trick play capabilities for linear content playback (pause live TV, back up, jump forward to current point of transmission) will not cause linear content to be considered nonlinear.

Nonlinear Content: Nonlinear content refers to content where the viewer can control the playback of the content and can jump to arbitrary points in the content. Examples of nonlinear content include: video on demand, podcasts, downloadable content, YouTube and similar online video sites, as well as playback of previously recorded linear content.

Broadcast and Broadcast Transmission: A broadcast transmission, or broadcasting, refers to wide-scale single point to multiple recipient distribution of content. A variety of transmission media can be used, e.g. television, cellular, satellite, as well as wired communications (e.g. cable or fiber.) The distinguishing characteristic of a broadcast, as opposed to a unicast, transmission is the one-to-many nature of the transmission.

Usage note: embodiments often make use of the spectrum of broadcasters, for example an NBC affiliate in the San Francisco Bay Area, for delivering content to viewers. As such, sometimes the terms "broadcast" or "broadcast transmission" can refer to the activities of those broadcasters. The meaning should be apparent from the context. For example, in the San Francisco Bay Area, a provider contracts with the local NBC broadcast affiliate for broadcast spectrum to deliver 10 MB of bandwidth. The provider then uses that 10 Mbps of bandwidth for the broadcast transmission of four high-definition cable channels as linear programming, e.g. Bravo, Lifetime, Food Network, and Syfy networks. Those networks are linear content sent as broadcast transmissions to the viewers.

Unicast or Unicast Transmission: A unicast transmission, or unicasting, refers to point to single point distribution of content. Typically, the transmission medium is a broadband, or high-speed, network connection. An example of a unicast transmission would be the delivery of a video on demand purchase to a single viewer over a high-speed network such as the internet. Some internet content delivery companies, e.g. Akamai, talk of offering "broadcast scale" transmissions; however, the offerings are, in fact, hundreds, or millions, of unicast transmissions.

Real Time: The term "real time" has two distinct meanings in the context of this subject. The first meaning refers to a minimal delay from an original transmission until the program can be received and viewed. For example, a range from milliseconds to a couple of minutes in some circumstances would still be considered real time. The acceptable waiting time will be described in the context of the usage. These delays occur because the original transmission must be received, processed, retransmitted, and received by the viewer's equipment and displayed. Continuing the earlier example from above of broadcasting the Bravo network over the local NBC broadcast affiliate's bandwidth, it may take a few seconds for the Bravo satellite signal to be received, transcoded, encrypted, and sent back out over that local NBC broadcast affiliate to a viewer's reception equipment. Some networks may include a short tape delay as part of a live broadcast, but this would still be considered a real time transmission.

The second meaning of "real time" refers to the suitability of a content stream for viewing relative to when a viewer initiates a request for playback of content and when the user can begin watching the content continuously. Depending on the context and viewer expectations, different periods of delay may be acceptable. The acceptable waiting time will be described in the context of the usage. Which of the two meanings is intended should be apparent from the context.

Non-real time: Non-real time refers to transmissions and viewing characteristics that do not meet the definition(s) of real time.

System Overview

Figure 1:
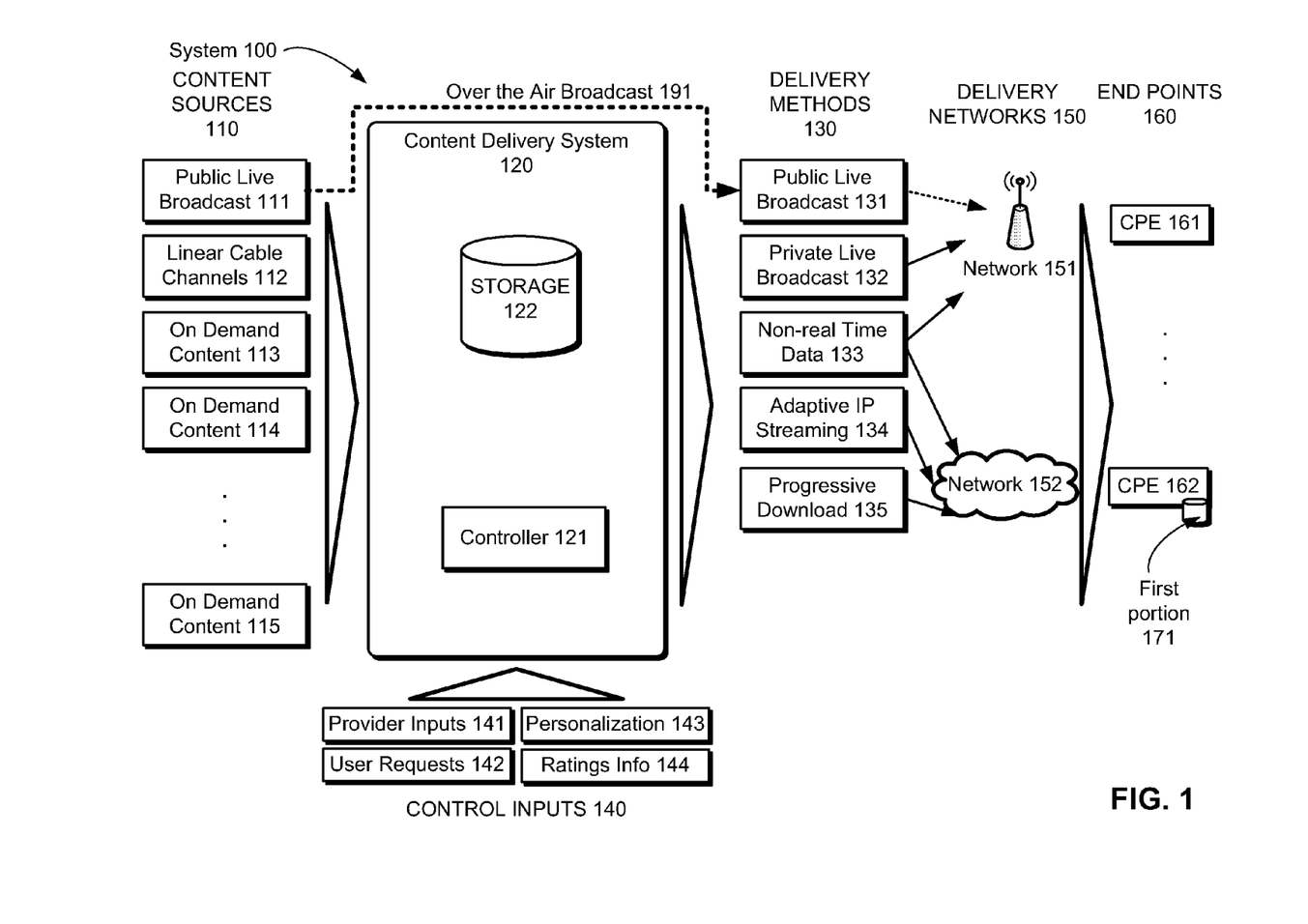
FIG. 1 shows an architectural level schematic of a system in accordance with an embodiment.

A system and processes described afford an easy way to provide remote recording of linear content with improved local playback and control of the playback. The system will be described with reference to FIG. 1 showing an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described followed by their interconnections. Then, the use of the elements in the system will be described in greater detail.

FIG. 1 includes a system 100. The system includes content sources 110, a content delivery system 120, delivery methods 130, control inputs 140, delivery networks 150, and end points 160. The content sources 110 include public live broadcast 111, linear cable channels 112, and on demand content 113-115. The content delivery system 120 includes a controller 121 and a storage 122. The delivery methods 130 include public live broadcast 131, private live broadcast 132, non-real time data 133, adaptive IP streaming 134, and progressive download 135. Note that the difference between adaptive IP streaming 134 and progressive download 135 generally relates to the size of the buffer (progressive download 135 generally uses a larger buffer) and whether or not the approach requests different bit rates of the requested file in response to network conditions (adaptive IP streaming 134 will request different chunks of a piece of content at different bit rates in response to network conditions, while progressive download 135 will maintain a constant bit rate). The control inputs 140 include provider inputs 141, user requests 142, personalization 143, and ratings information 144. The delivery networks 150 include a network 151 and a network 152. In one embodiment, the network 151 is a broadcast network, e.g. transmission using a portion of the TV, cellular, Wi-Max, etc., spectrum. In some embodiments, the network 151 may use a wired medium such as a dedicated portion of a cable or fiber optic network. In one embodiment, the network 152 is a unicast network, e.g. transmission over the internet. The end points 160 have customer premises equipment (CPE) 161-162. The CPE 162 includes a first portion 171, which will be explained infra.

The interconnection of the elements of system 100 will now be described. The content sources 110 are coupled in communication to the content delivery system 120 (indicated by large triangle). The different sources may arrive via different mechanisms. For example, the public live broadcast 111 may be received using aerial antennas coupled to ATSC or other digital TV tuners. The linear cable channels 112 may be received via satellite downlink or over some other communications channel, e.g. encrypted content received over the internet. The content delivery system 120 may itself be geographically distributed, e.g. controller 121 and storage 122 are located in multiple places throughout the country or a region. For example, the public over-the-air broadcasts of San Francisco television stations must be received in the San Francisco area. However, the physical location of the primary network operations center of the content delivery system 120 may be in Florida. In this embodiment, cable feeds for linear cable channels 112 might be received via satellite downlink in Florida while local public live broadcasts in San Francisco may be received locally in San Francisco. More generally, the controller 121 may be a multitude of computer systems of a variety of types operating in conjunction and communication with one another to provide programming services to the end points 160. Similarly, the storage 122 may be a vast amount of data storage across a variety of systems and providers to store both on demand content 113-115 as well as user requested recordings.

Note also the dotted line representing the over the air broadcast 191 coupling the public live broadcast 111 to the public live broadcast 131 that bypasses the content delivery system 120 en route to end points 160 via network 151. This dotted line shows the standard over the air transmission, e.g. the local NBC affiliate in the San Francisco Bay Area reaching CPEs 161-162 if the customer can get good quality reception of that channel.

Continuing to describe the interconnections, the content delivery system 120 can make use of a number of delivery methods 130 to distribute content to end points 160. One delivery method is private live broadcast 132 which is transmitted over network 151. One example would be sending four cable networks in encrypted form over a portion of the local NBC affiliate's bandwidth in the San Francisco Bay Area. Another delivery method is non-real time data 133 which can be sent via either network 151 or network 152. The remaining delivery methods 130 can be adaptive IP streaming 134 and progressive download 135, both via network 152. The primary differences between the two were discussed, supra. The delivery networks 150 provide the communications channel to reach the end points 160 via their CPEs 161-162. Lastly, the content delivery system 120 receives a variety of control inputs 140. Some control inputs 140 come from the interactions of end points 160 with their CPEs 161-162. Others come from the operator of the content delivery system 120. The communications channels for those control inputs 140 are not shown in FIG. 1.

Having described the elements and their interconnections, the use of the system will be described in greater detail. The system 100 allows the provider operating the content delivery system 120 to offer a range of services to end points 160 via their CPEs 161-162. For example, users might purchase a package with the over the air channels in their area together with approximately 45 cable channels (linear cable channels 112). Some channels could be delivered via private live broadcast 132 over network 151 to the CPEs 161-162 using 20-30 Mbps of broadcast spectrum licensed from various providers such as TV, cellular, Wi-Max, etc. The remaining channels in the package can be delivered via adaptive IP streaming 134 over network 152 to the CPEs 161-162. One capability of the content delivery system 120 is to switch which of the linear cable channels 112 are provided to end points 160 via broadcast and which are provided via IP streaming at different times of the day, week, etc., based on the control inputs 140.

In some embodiments, the CPEs 161-162 are set top boxes, or other dedicated hardware, with the capability to receive programming over multiple networks simultaneously. The antennas for receiving the broadcast signals may be integrated or separate. In other embodiments, the CPEs 161-162 are computers with an antenna and tuner. In other embodiments, the antenna can be a network attached antenna. In still other embodiments, the CPE may be a hybrid "PBX-like" unit serving multiple dwellings in an apartment or residence with additional CPE equipment in each dwelling. We will focus on the CPE 162 which is a set top box with a network antenna that is operated by a remote control for the remainder of this example.

The provider of the content delivery system 120 faces different costs depending on which network is used. In general, the network 151 is created from licensed broadcast spectrum that is paid for once. There are minimal variable costs on network 151 depending on the amount of data transmitted. The network 151, also being broadcast in nature, permits greater distribution with a single transmission and has a high fixed cost. In contrast, the network 152 may have low fixed costs but high variable costs based on the amount of data the content delivery system 120 transmits or needs to transmit in unicast fashion. For example, to permit 10,000 viewers to watch a linear showing of "Iron Chef America" over network 151, approximately 1.5 Mbps of total bandwidth is needed. In contrast to a broadcast transmission, an adaptive IP stream of "Iron Chef America" to the same number over end points over network 152, may have bandwidth requirements closer to 10,000×1.5 Mbps.

Accordingly, control inputs 140 are used by the content delivery system 120 and, in particular, by the controller 121 to determine which delivery methods 130 to use for which content. The provider inputs 141 can include the costs and maximum capacity of the different networks, the traffic load placed on the different networks, manual scheduling/routing decisions, and the like. Similarly, ratings information 144, e.g. Nielsen or Arbitron viewership information, can help optimize the use of the network 151. If more popular content is broadcast, then the amount of adaptive IP streaming 134 over network 152 can be reduced. Other inputs include personalization 143 and user requests 142. Conceptually, the personalization 143 includes information similar to the ratings information 144 but customized for the end points 160. Further, since the content delivery system 120 may be geographically distributed, the usage of the network 151 may be different in different regions. For example, if the San Francisco Bay Area loves "Iron Chef America," the Food Network may be broadcast over network 151 there, while the Food Network may be adaptive IP streamed in another region based on actual viewership habits of the provider's customers. The user requests 142 are requests for specific content. These may be explicit requests such as "record all new episodes of Iron Chef America" or implicit requests created by the CPE 162. For example, the CPE 162 includes a personalization and recommendation system that may have determined that user #1 of the CPE is likely to want to watch "The Sopranos" and so it should be recorded. The CPE 162 can communicate the user requests 142 to the content delivery system 120. This can modify the use of the networks but also permit the content delivery system 120 to record the linear content to the storage 122 for later playback on the CPE 162.

Returning to how the system 100 provides remote recording of linear content with seamless local playback and control of the playback, consider a request from an end user on the CPE 162 to record the next episode of "Iron Chef America" from the Food Network. One decision that arises is where to perform the recording. For this example, the recording will be performed at the content delivery system 120. See, infra, for more discussion of this decision.

The controller 121 tracks the user requests 142, including the request by CPE 162 for "Iron Chef America." At the start of the linear program, the controller 121 captures the Food Network linear content from the linear cable channels 112 into the storage 122. In some embodiments, separate recordings may be made for each CPE that requested the content; in others, only a single recording is performed. Because the content is linear, if the user request 142 does not reach the controller 121 prior to the commencement of the program, the end user will not be able to get access to the full program, but only the portion from where they made the request.

The recorded content, "Iron Chef America" for CPE 162, will be saved to the storage 122. In some embodiments, the recorded content is stored at multiple bit rates and/or encodings. Further, in some embodiments the content is divided into chunks. The rationale for this will be discussed in connection with FIG. 2 in greater detail, infra.

The content delivery system 120 will divide the recorded content into a first portion and a second portion. This division is best viewed as a duration, or time into the recording, since the underlying content may be stored as hundreds, or thousands, of chunks at multiple bit rates. The first portion will generally be significantly smaller in size than the second portion, and is typically only the first few minutes of a program. Each of the portions may itself be composed of chunks. The division process will be described in greater detail in connection with FIG. 3, infra.

In this example, the content delivery system 120 transmits the first portion 171 to the CPE 162 before the user requests playback of the recorded content. Additionally, an index file for supporting trick play (fast forward, rewind, etc.) can be transmitted with the first portion. The first portion can be sent over the network 151 (non-real time data 133) or network 152 (progressive download 135). The choice of network will depend on the number of requests for the recording. If "Iron Chef America" is popular in a geographic region and playback generally is not until later, then sending the first portion as non-real time data 133 over the network 151 can reduce the bandwidth demands and expense of using network 152. For more niche content, network 152 may be used. Different geographical regions may have the same recorded content provided to CPEs differently. Additionally, depending on the available bandwidth over the network 151, the non-real time data containing the first portion may be transmitted closer in time to the original recording. For example, if the first portion is three minutes long and there is sufficient bandwidth in network 151, the content delivery system 120 might start transmitting the first portion just a few minutes into the recording of the content, e.g. three minutes plus some delays for transcoding and encoding the chunks for the first portion.

In another embodiment, the CPE 162 makes the request for the first portion to the content delivery system 120. This can be transmitted as a user request 142 and the first portion can be delivered as non-real time data 133 over an available network. Similarly, the CPE 162 can request the index file.

When the user requests playback of the recorded content, the CPE 162 can begin playing the first portion 171 from the local storage on the CPE. Meanwhile the CPE 162 can communicate with the content delivery system 120 for delivery of the second portion via network 152. The delivery of the second portion can be via adaptive IP streaming. The CPE 162 and/or the content delivery system 120 can select the bit rates and corresponding chunks based on the network performance to provide a continuous, real time playback experience to the end user with no noticeable start-up delay or stuttering due to required buffering. For these purposes the playback would begin less than a second from when the user makes the request, and the playback would be uninterrupted during continuous real time viewing assuming normal network conditions. The playback will be described in greater detail in connection with FIG. 4, infra.

Summarizing, the architecture of system 100 and the components and mechanism through which it provides remote recording of linear content with seamless local playback and control of the playback have been described.

Decision of Where to Record

The decision as to whether the recording is performed at the content delivery system 120 and/or the CPE 162 can be made solely at the CPE 162 in one embodiment; in another, the decision can be made solely by the content delivery system 120; in others, the decision can be made by some combination of the two. Further, the decision may change over time as more requests come in. For example, if Syfy is generally transmitted over the private live broadcast 132 in a given geographical region, the CPE 162 might decide to record a given program, e.g. "Caprica," locally. However, if the content delivery system 120 makes a change to the line-up so Syfy is being delivered by adaptive IP streaming 134, it may be more efficient to switch the recording to the content delivery system 120.

In one embodiment, the following basic rules can be used to decide the recording location (provided adequate tuning capacity is available on the CPE): record public live broadcasts 131 locally on the CPE; record private live broadcasts 132 locally on the CPE; record linear cable channels 112 delivered via adaptive IP streaming 134 remotely on the content delivery system.

Further, in one embodiment, the CPE may communicate all recording requests (user requests 142) to the content delivery system 120 to facilitate channel line-up changes between the private live broadcast 132 and the adaptive IP streaming 134. In one embodiment, the content delivery system 120 may notify the CPE, e.g. CPE 162, that a prior user request will be recorded remotely. This frees up the resources of the CPE 162 to record other programming.

In another embodiment, the CPE 162 can receive updates from the content delivery system 120 of channel delivery methods and schedules as well as changes to the schedules. The CPE 162 can then respond to such a change and send a user request 142 for remote recording of a specific show that is now going to be adaptive IP streamed instead of private live broadcast, etc.

In another embodiment, the CPE 162 and/or the content delivery system 120 make the decision of where to record based on the reception characteristics of the network 151 (e.g. a broadcast network) with respect to a particular CPE, channel and recording. In some embodiments, the CPE 162 may maintain information about the broadcast reception characteristics, e.g. the NBC affiliate does not tune in well in the evenings, or right now tuning problems are occurring for the NBC affiliate. If, for example, the Food Network, is broadcast over the local NBC affiliate to CPE 162, this would present a problem for recording content from the Food Network during the reception problems. The information about reception status can be conveyed to the content delivery system 120 explicitly and/or a prior, or future, request for recording content can be rescheduled to the content delivery system 120 (from the CPE 162) in response to the reception status.

Additionally, the basic rules can be altered when there are conflicting demands placed on the CPE 162. Many CPEs have user personalization features to recognize and support requests from multiple users. If the requests conflict, e.g. the CPE 162 has two tuners and there are three requests for recordings at the same time, the CPE can request that the content delivery system 120 perform some of the recordings. In some embodiments, where recordings overlap in time (e.g. a baseball game goes into extra innings and now conflicts with another recording), the CPE 162 may record part of one show, while the provider records the other part. These parts are then coordinated for playback on the CPE 162, and the part, or parts, on the content delivery system 120 would be divided into multiple portions, according to the processes of FIG. 3 and FIG. 4 if necessary, for a seamless playback experience.

The architecture used for progressive download 135 over the network 152 will now be discussed with reference to FIG. 2.

Unicast Delivery Overview

The unicast delivery architecture, in accordance with an embodiment, will be discussed with reference to FIG. 2. FIG. 2 shows an architectural level schematic of a system for providing internet protocol (IP) delivery of audiovisual content. In particular, this illustrates the architecture for both the adaptive IP streaming 134 and progressive download 135 delivery methods 130. Because FIG. 2 is an architectural diagram, certain details are intentionally omitted to improve the clarity of the description. Further, shared reference numerals between FIG. 1 and FIG. 2 refer to the same items. The discussion of FIG. 2 will be organized as follows. First, the elements and interconnections of the elements of the figure will be described. Then, the use of the elements in the system will be described in greater detail.

Figure 2:
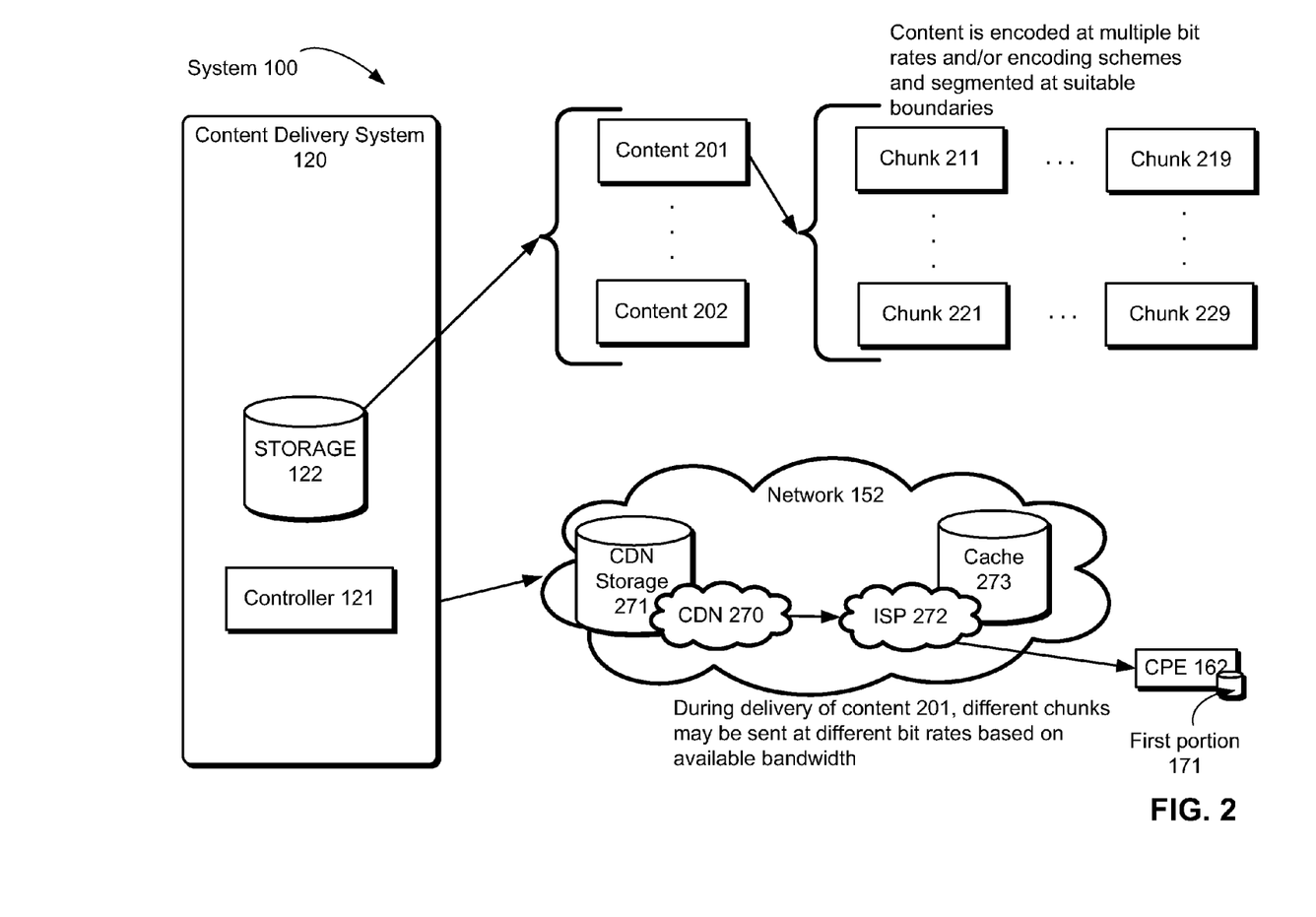
FIG. 2 shows an architectural level schematic of a system for providing internet protocol (IP) delivery of audiovisual content.

FIG. 2 includes a system 100. The system 100 includes the content delivery system 120. The content delivery system 120 includes the controller 121 and the storage 122. The system 100 includes the network 152 and the CPE 162 coupled in communication via the network 152. The CPE 162 includes the first portion 171. The network 152 is shown in greater detail here with a content delivery network (CDN) 270 and an internet service provider (ISP) 272. The CDN 270 has a CDN storage 271 and the ISP 272 has a cache 273. In some embodiments, the provider operates the CDN; in other embodiments, the provider contracts with one or more third-party CDNs. The third-party CDNs have geographically distributed and/or collocated their equipment, e.g. CDN storage 271, with a wide array of ISPs to better distribute HTTP content to end points 160. Further, as FIG. 2 shows, the ISPs may implement HTTP caching (cache 273). While FIG. 2 shows a CDN and ISP between the content delivery system 120 and the CPE 162, the CPE 162 can in some embodiments communicate directly with the content delivery system 120.

The storage 122 is shown in greater detail in FIG. 2 and specifically includes content 201-202. Further, the encoding of content 201 is shown in greater detail, specifically the presence of multiple encodings and/or bit rates. For example, content 201 is encoded in a first format at a first bit rate as chunks 211-219, and in a second format at a second bit rate as chunks 221-229. One embodiment uses H.264 encoded video encapsulated in MPEG-2 transport stream as the format and different bit rates for the encoding. The chunks are segmented at suitable points based on the selected encoding format, e.g. IFRAME boundaries, etc. Further, the number of chunks typically can be quite high, with the chunk sizes covering only a few seconds, because with smaller chunk sizes there can be advantages in how quickly the CPE can react to changes in the load placed on the last mile and home network. Some embodiments, take advantage of how the network 152 has been optimized for delivery of moderately sized HTTP responses. In one embodiment, the preferred protocol for requesting and delivering the chunks is HTTP requests and responses. The CDN storage 271 and the cache 273 may hold varying amounts of chunks on the storage 122.

Note that, for linear cable channels 112 sent out for adaptive IP streaming 134 to CPE 162, the linear content can be processed by the controller 121 of the content delivery system 120 at multiple bit rates and/or encodings. The linear cable channels are then sent out in real time (delay of a few seconds to a few minutes) relative to receipt by the provider at suitable bit rates to permit continuous real time viewing. The transcoding process of preparing the linear content can use a similar chunking approach as described supra, and the request and transmission can be similar. When a user selects an adaptive IP stream, there can be some "tuning" delay as the adaptive IP stream is started and transmission of the stream out to the CPE 162 begins.

The use of the elements in the system will now be described in greater detail. Returning to the delivery of the content, the availability of multiple encodings and, in particular, multiple bit rates provides for adaptive behavior and a good playback experience for the end user. The choice of which encoding to send can be under the control of one or more of: the content delivery system 120, the CDN 270, the ISP 272, and the CPE 162. In one embodiment, the CPE 162 customizes the content requests made to the content delivery system 120 and the CDN 270, based on the network performance, e.g. first 1.5 Mbps chunk, next 4.0 Mbps chunk, etc. In another embodiment, the CDN 270 automatically provides the most appropriate bit rate chunk to the CPE 162 based on the network performance.

Regardless of how the decision is made regarding which bit rate chunk to send, the end result is a better user experience because there is less likelihood of playback pause due to buffering and network performance changes during the delivery. Consider the example where the content 201 is an episode of "Iron Chef America" and chunks 211-219 and 221-229 both correspond to minutes 1 through 9 of the program, encoded at different bit rates. Thus, for streaming playback of those minutes, the first chunk received by the CPE 162 might be a low bit rate chunk (1.5 Mbps), e.g. chunk 211, but the second chunk received by the CPE 162 might be a higher bit rate chunk (2.0 Mbps), e.g. chunk 222. The third chunk might be an even higher bit rate chunk (4.0 Mbps, not shown in FIG. 2), while the remainder might be at 2.0 Mbps, e.g. chunks 224-229.

In the above scenario there is still some buffering time where the CPE 162 will typically wait until it receives and buffers a number of chunks before allowing playback to start. The exact length of the waiting time will depend on the network performance as well as any user preferences, e.g. only wants 2.0 Mbps or better content. If the user only reliably has 1.0 Mbps of high-speed bandwidth, then even a 1.5 Mbps stream would need to be buffered to provide a good playback experience. Note that in this example adaptive IP streaming might be out of the question unless the provider has an even lower bit rate, e.g. 0.5 or 1.0 Mbps, encoding of chunks.

An estimate of the network performance over network 152 can be maintained by the content delivery system 120 and/or the CPE 162. In some embodiments, the network performance is tracked based on historical performance of the CPE 162 in requesting content over the network 152. In such an embodiment, a default network performance rate, e.g. 1.5 Mbps, may be assigned by the provider to a new CPE, e.g. CPE 162, which is then adjusted over time. The default rate might be selected based on the provider's qualification requirements, e.g. users that purchase the CPEs 161-162 and/or subscriptions must confirm a certain bandwidth. In some embodiments, the network performance is determined by conducting a series of tests in which the CPE 162 communicates with the content delivery system 120. These tests can determine an approximate bandwidth and latency of the network 152. If the delivery of content over network 152 occurs through multiple tiers, the network performance can also vary depending on the tier from which the content is retrieved. For example, chunks in the cache 273 at ISP 272 may be retrievable at a higher bit rate, and with lower latency, than chunks at the CDN storage 271 of CDN 270. In some embodiments, a worst case assumption about the network performance may be made, e.g. all chunks retrieved over the slowest, highest-latency source within the communication channel between the content delivery system 120 and the CPE 162.

Figure 3:
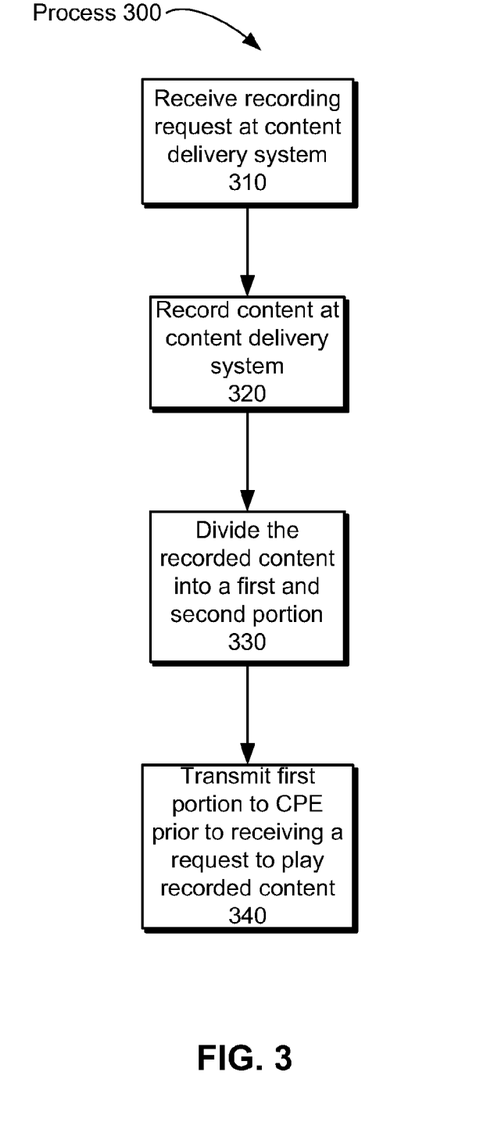
FIG. 3 shows a flowchart illustrating the process of remotely recording a program and transmitting a first portion to a customer premises equipment (CPE) prior to a request to play the recording.
Figure 4:
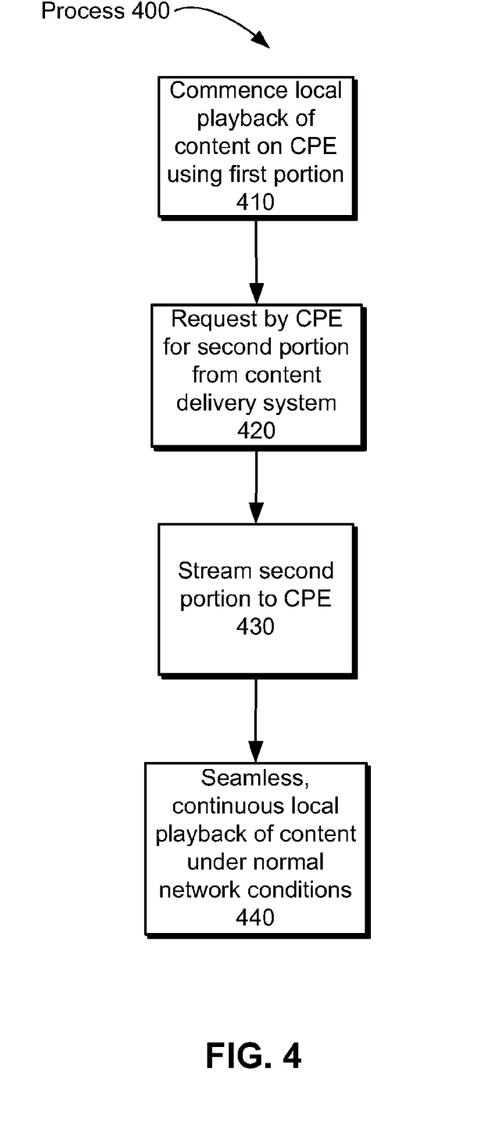
FIG. 4 shows a flowchart illustrating the process of locally playing a program on a CPE when the program has been remotely recorded.

Now consider a new example in which the content 201, again, is "Iron Chef America," and the first portion and second portion have been determined; see discussion of FIG. 3 and FIG. 4, infra. In this example, if the chunks corresponding to the first portion 171 are already present on the CPE 162 prior to the request for playback of the content 201, the CPE 162 can begin immediate playback. Meanwhile, the retrieval of the chunks corresponding to the second portion can commence in the background. For example, if the first portion 171 is chunks 211-213 and the second portion (not shown) is chunks 214-219, then those chunks can be requested while chunks 211-213 are playing back.

This discussion has focused on an embodiment optimized around the use of HTTP protocol over IP for delivery of content over network 152; other delivery methods can be used. The HTTP delivery method is designed to leverage performance characteristics of the public internet and, in particular, the present HTTP orientation, caching and content delivery network capabilities.

Having described the overall system and content delivery approaches, the specific methods used by some embodiments for apportioning and dividing the content will now be discussed.

Methods

Figure 5:
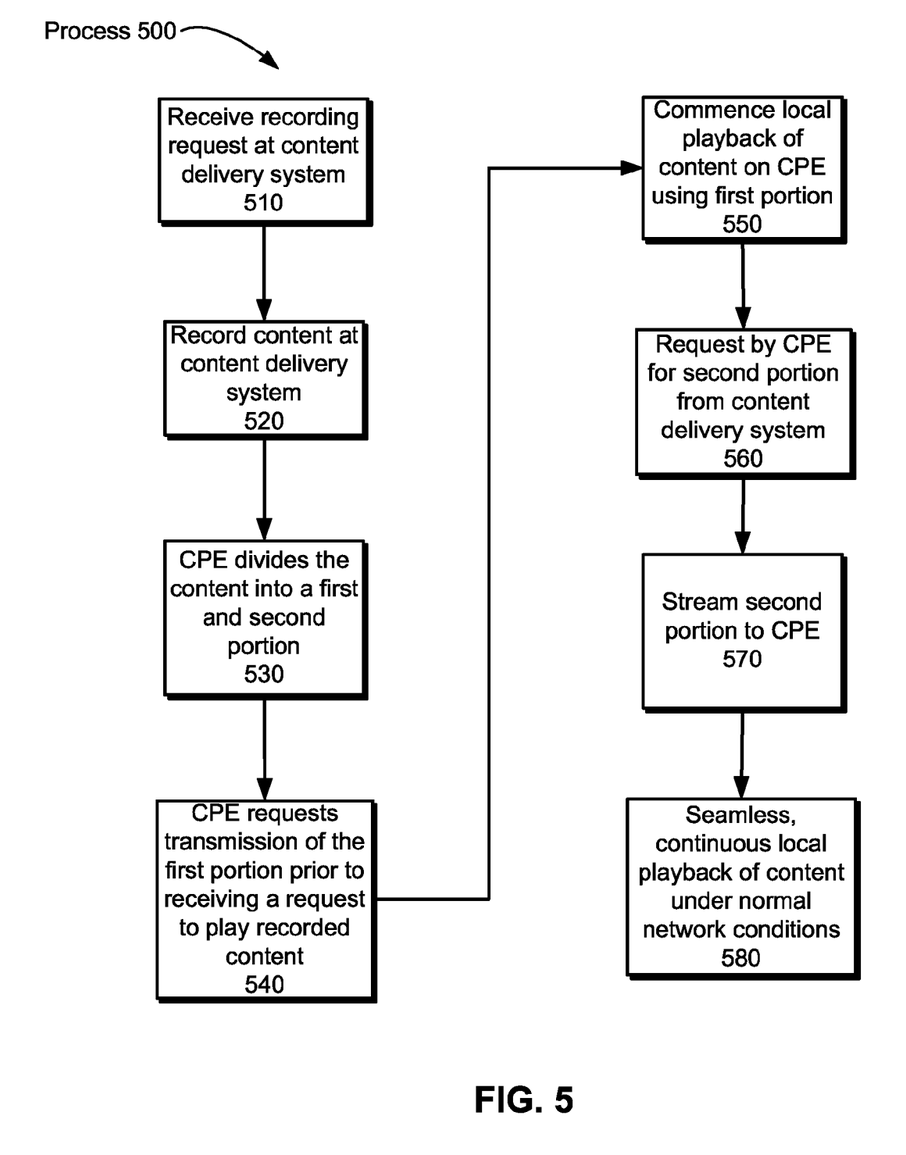
FIG. 5 shows a flowchart illustrating the process of remotely recording a program and a CPE requesting a first portion prior to a request to play the recording locally.

The method used by some embodiments to provide the remote recording of linear content with seamless local playback and control will now be described with reference to FIGS. 3-4. Additionally, FIG. 5 showing another embodiment will be discussed, infra. FIG. 3 shows a flowchart illustrating the process of remotely recording a program and transmitting a first portion to a customer premises equipment (CPE) prior to a request to play the recording. FIG. 4 shows a flowchart illustrating the process of locally playing a program on a CPE when the program has been remotely recorded. Both figures implement processes that take place in the environment of system 100 of FIGS. 1-2. In general, process 300 of FIG. 3 will occur first in time (recording) and be followed by process 400 of FIG. 4 (playback). However, the two can overlap in time with process 400 beginning while process 300 occurs.

FIG. 3 includes a process 300 that starts with step 310 and the receipt of a record request at a content delivery system. The request must be for linear content occurring at a future point in time, or occurring now. Thus, a user can record tomorrow's episode of "Iron Chef America" but cannot request yesterday's episode. Similarly, you may be able to request the recording of an already in progress content, e.g. you make the request ten minutes into the show. Even if other user requests from other CPEs caused the entire show to be recorded, for legal reasons, in general you can only access the portion of the recording you specifically requested. In the context of one embodiment of system 100, the request would come from a CPE, e.g. CPE 162, to the content delivery system 120 as user requests 142 over the network 152.

Next, at step 320, the content delivery system records the content. As discussed previously this requires suitable reception equipment such as antennas, satellite dishes and/or tuners to record the content as it airs. In the context of the system 100, the controller 121 would control the recording of the content from the public live broadcast 111 and/or linear cable channels 112 into the storage 122.

Next, at step 330, the recorded content is divided into a first and second portion. Importantly, this division can occur during step 320, e.g. while the recording is taking place. As noted, in some embodiments the actual recording of the content is divided into multiple chunks at varying bit rates, so that the portions correspond to time durations within the content as opposed to a physical division of the content. Consider a 60-minute program as the content; the first five minutes might be the first portion and the remainder the second portion. How is that determination made? Embodiments focus on calculating a duration such that if the first portion is stored locally at the CPE, then the first portion is of sufficient duration to permit continuous playback of the content at the CPE under normal network conditions, while the second portion is transmitted to the CPE from the content delivery system.

In one embodiment, the duration of the first portion can be determined using the expected transmission time at a given bit rate, e.g. 1.5 Mbps. Consider a content such as a 30-minute TV show which encoded at 1.5 Mbps resulting in a file size of 350 megabytes (MB), or 2800 megabits (Mb). At 1.5 Mbps, 2800 Mb would take approximately 31 minutes to transmit. Assuming constant 1.5 Mbps transmission, if somewhere between one and two minutes were local, the remaining $28/30$ths of the content (assuming two minutes of content are local) would take approximately 29 minutes to be delivered at 1.5 Mbps. This would allow streaming to begin at minute 3 with all packets arriving in advance of the need for playback. As a practical matter, the normal network characteristics of a network such as the internet are rarely that precise. Thus, additional time would be built in to the calculation of the duration of the first portion to ensure a continuous playback experience under normal network conditions observed over the network 152.

Additional factors used by some embodiments in making the calculation of the size of the first portion include one or more of:

historical consumption of recorded content;
changing network performance;
changing costs for network access;
time a particular user or group of users typically begins watching a recording;
the kind of content (sports vs. comedy shows, for example, might have different patterns);
the age of the user making the request (young kids are unlikely to be awake at night, so transmission could be done later in the evening; however, kids are likely to watch shows in the morning);
rating assigned by a user to content (higher rated programs more likely to be viewed by the user);
third-party ratings data;
adjustments by the provider (for example, the first and last episode of a season might follow a different transmission and viewing pattern than other episodes and be given higher priority);
reception quality of the broadcast (time of day, weather conditions, etc);
popularity of other shows and, therefore, demands on the overall network;
available storage at the CPE;
failures of various networks to deliver content (e.g. broadcast failure);
varying bit rates for different chunks within the portion (e.g. lower bit rate for introduction and credits of TV shows and movies); and
timing of the recording request relative to the start of the program (e.g. if the user only recorded the last 25 minutes of a TV show, the opening introduction is not there to be skipped).

Since embodiments can transmit the first portion from the content delivery system 120 to the CPE(s) through multiple delivery methods, the duration may be different for each delivery method, and the controller 121 is responsible for computing the duration of the first portion. For example, if the first portion is sent via broadcast transmission as non-real time data 133 over the network 151 to multiple CPEs at once, it may be beneficial, bandwidth permitting, to make the first portion slightly longer than if a unicast transmission over network 152 to each CPE one-by-one had been used. Further, in the case of the unicast transmission, there is greater flexibility for the content delivery system 120 to tailor the duration of the first portion to the specific performance of the network to that CPE. For example, a CPE on a higher bandwidth, lower latency connection might receive a smaller first portion than a CPE on a lower bandwidth, higher latency connection. In another embodiment, if the provider expects a minimum bandwidth to all CPEs over the network 152, that minimum bandwidth can be used to determine the duration of the first portion.

In other embodiments, default lengths are set and/or adjusted by the provider based on prior experiences, e.g. seven minutes of a 30-minute show and ten minutes of a 60-minute show. Some such adjustments may be based on user behaviors. In one embodiment, the controller 121 and the CPE 162 track user behavior, e.g. personalization 143 and the like, to make determinations. Consider content that includes commercials and opening credits at the beginning. If most 30-minute programs have a one-minute lead-in, a one-minute opening, and two minutes of commercials followed by the resumption of the main program, many users may use trick play features to skip through much of the first few minutes, consuming it in perhaps just two minutes instead of five. If the first portion is only five minutes long because the assumption is that the user will not be watching minute six of the program until six minutes in, the user might be presented with a buffering screen after two minutes of watching rather than continuous playback. In contrast, shows without commercials would not need as much padding. Similarly, shows where users generally watch the commercials and/or opening sequence would not need as much padding. Not all embodiments account for these behaviors, as the focus is on providing a baseline experience of continuous front-to-back playback.

Continuing with the discussion of process 300, at step 340 the first portion is transmitted to the requesting CPE(s) prior to receiving a playback request (e.g. prior to step 410 of process 400 commencing). Importantly, as with step 330, this step can occur while step 320 is still occurring, e.g. while recording is still taking place. In some embodiments, an index file to improve the user experience of trick play capabilities (fast forward, rewind) can also be transmitted as part of step 340 or separately (not shown). In one embodiment, the index file is comprised of IFRAMES of the content. In some embodiments, if the entire content is not yet recorded, an index file of the portion of the content that has been recorded can be transmitted and supplemented when the full recording is complete.

As discussed in connection with step 330, supra, the transmission can occur over multiple networks. Further different CPEs that requested the same content might receive the first portion differently. For example, in one geographic region the network 151 might be used to broadcast transmit the first portion of a recorded content, while in another geographic region, the first portion is sent via unicast transmission over the network 152. Additionally, some embodiments may use peer-to-peer networking between the CPEs 161-162 over the network 152 to distribute content.

The controller 121 of the content delivery system 120 determines which network to use and when to make the transmission. The number of user requests in a geographic region (e.g. reachable CPEs that requested the content), the available broadcast spectrum and bandwidth (e.g. in South Florida does the provider only have 10 Mbps of broadcast spectrum so none is available for recordings), and the viewing patterns (e.g. do people watch quickly or days later) are used to make the determination. High user demand with more delayed viewing favors broadcast transmission via network 151, since generally there is more bandwidth in network 151 for transmitting the recordings at off peak hours versus prime time. Lower user demand with more desire to watch while the show is still recording generally favors unicast transmission via network 152. These are not absolutes and, for example, if it is known that a large number of people record "The Office" and watch it starting 15 minutes in, the provider may be able to perform process 300 and in particular step 340 over the network 151 using broadcast spectrum prior to that 15-minute mark.

Turning to FIG. 4, process 400 begins at step 410 with a request for playback of the content on the CPE. Because the first portion, e.g. the first portion 171 on CPE 162, will be used to satisfy the playback request, this must occur after step 340. However, as stated, the recording may still be ongoing, e.g. step 320. Notably, playback of the content begins for the user in real time (e.g. less than one second response time) as if the entire content were local to the CPE.

Next, at step 420, the CPE requests the second portion from the content delivery system, which in turn streams the content to the CPE at step 430. As discussed in connection with FIG. 2, supra, HTTP requests and responses to deliver the content in chunks may require multiple requests by the CPE for portions of the content, e.g. multiple iterations of step 420 and then step 430 until the second portion is fully delivered. The second portion is also stored locally on the CPE. This storage can be either temporary (e.g. buffer) or quasi-permanent (e.g. until the user deletes the content and/or the right to watch the recording expires). Additionally, although steps 420-430 are described in conjunction with direct requests to the content delivery system 120, some embodiments may permit indirect requests (e.g. via the ISP 272 and/or the CDN 270) with the request only "hitting" the content delivery system 120 if it cannot be fulfilled by the intermediary (e.g. not cached in cache 273 or available in CDN storage 271).

At step 440, the local playback of the content is continuous, or seamless, for front-to-back playback in real time for the end user as the second portion is received. Steps 420-430 may be viewed as occurring simultaneously with step 440 because the user is watching the content on their viewing device coupled in communication with the CPE as steps 420-430 are occurring. Local playback is important because trick play requests (pause, fast forward, rewind) can be satisfied by the CPE without the need for further communication with the content delivery system 120. For example, if the user requests that the playback be paused, the CPE can stop playing content. That may have no effect on the continuation of steps 420-430 in the background. Similarly, for fast forward and rewind, no communication with the content delivery system 120 is required—unless the user attempts to fast forward past what has been obtained by steps 420-430. A good example would be fast forwarding through the opening credits. Since the first portion—and ultimately the second portion—is local to the CPE, the CPE can move through that portion of content without needing to communicate with the content delivery system 120. Additionally, if the content delivery system 120 has prepared and provided an index file (either as part of step 340 or separately), the trick play experience can be of quite high quality without the need for significant computation or processing of the content at the CPE.

FIG. 5 shows a flowchart illustrating the process of remotely recording a program and a CPE requesting a first portion prior to a request to play the recording locally. FIG. 5 includes a process 500 used by one embodiment; the process steps are analogous to steps described above in connection with process 300 and process 400. Process 500 starts with step 510 and the receipt of a record request at a content delivery system. This is analogous to step 310 and, as in step 310, the request could come from a CPE 162 to the content delivery system 120 as user requests 142 over the network 152.

Next, at step 520, the content delivery system records the content. This is analogous to step 320 and, as in step 320, the content would be recorded as it airs.

Process 500 diverges from process 300 at steps 530 and 540. In process 500, the CPE divides the content into a first and second portion (step 530), and the CPE proactively requests the first portion (step 540). The division process of step 530 can use some or all of the algorithms discussed in connection with step 330, supra. In this embodiment, because the CPE makes the request for transmission of the first portion, the first portion will be more likely to be transmitted as a unicast transmission, e.g. over network 152, as opposed to a broadcast transmission, e.g. over network 151. One alternative embodiment using process 500 modifies steps 530-540. In that alternative, the CPE makes the request for the first portion, but the content delivery system still performs the division.

The process 500 continues at step 550 with the commencement of local playback at the CPE. Once playback commences, the CPE requests the second portion (step 560). The second portion is streamed to the CPE at step 570, e.g. using adaptive IP streaming 134. This provides for seamless, continuous local playback of the content under normal network conditions (step 580). Steps 550-580 are analogous to steps 410-440 and the discussion, supra, applies.

As discussed, processes 300, 400 and 500 are designed to improve continuous, front-to-back playback. User requests to jump to points near the end of the content may still require playback to be paused to permit buffering.

Conclusion and Alternative Embodiments

We have now described a system and processes that afford an easy way to provide remote recording of linear content with seamless local playback and control of the playback. The system decreases the streaming bandwidth requirements that would be necessary for locally recording content, while also providing an improved playback experience of the remotely recorded content. Additional embodiments will now be discussed.

One alternative embodiment divides the content into multiple sets of first and second portions. An example may make this clearer. If the content is a 30-minute situation comedy, the content may have multiple commercial breaks, e.g. opening sequence, commercial 1, program section 1, commercial 2, program section 2, etc. Multiple first and second portions can be established so that the program sections after each commercial break are themselves divided into a first portion and second portion. Some or all of these first portions can be transmitted prior to the local playback request (e.g. at step 340 or 540). Similarly, for sporting events the beginning of each section (e.g. inning, quarter, half, etc.) might similarly be divided into separate first and second portions. Similarly, other logical points that a user might want to jump to can be used as division points, such as the beginning of a scene, time-based chapter markers in a movie, etc. The division process (e.g. step 330 or 530) might make the first portions later in the content of different duration than the initial first portion. Additionally, different bit rates can be used for different first portions. Returning to the example of a 30-minute situation comedy as the content, the first portion for the opening sequence and the first portion for the start of program section 1 might be longer and at a higher bit rate than the first portion for program section 4. Additionally, whether all of the first portions are transmitted en masse (e.g. at step 340 or 540) or incrementally may vary by implementation. In one embodiment, the content delivery system might send only the very first portion (step 340) but the CPE might request additional first portions (step 540).

Any data structures and code described or referenced, supra, are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

What is claimed is:

1. A computer-implemented method of recording linear content and delivering same using a content delivery system, comprising:
   recording a linear content at the content delivery system as a recorded content, the recording initiated in response to a request from a customer premises equipment (CPE) and the recording occurring during the time of transmission of the linear content;
   dividing the recorded content at the content delivery system into at least a first portion and a second portion, the first portion of sufficient duration to permit real time continuous playback of the recorded content on the CPE if the first portion has previously been transmitted to the CPE and the second portion has not previously been transmitted;
   transmitting the first portion from the content delivery system to the CPE; and
   subsequent to the transmitting, streaming and storing the second portion to the CPE from the content delivery system after playback of the recorded content has begun, wherein the playback is under control of the CPE from local storage.

2. The computer-implemented method of claim 1, wherein the transmitting of the first portion occurs via a first network and the streaming of the second portion occurs via a second network.

3. The computer-implemented method of claim 2, wherein the second network comprises the internet.

4. The computer-implemented method of claim 2, wherein the first network comprises a broadcast network implemented over broadcast transmission spectrum.

5. The computer-implemented method of claim 1, further comprising:
   preparing an index file for the content at the content delivery system, the index file for supporting trick play of the content; and
   transmitting the index file from the content delivery system to the CPE prior to a request for playback of the content.

6. The computer-implemented method of claim 5, further comprising:
   during playback of the recorded content, using the index file to display static images during a fast forward operation to portions of the recorded content that are unavailable in local storage.

7. The computer-implemented method of claim 1, wherein a second request is sent from the CPE to the content delivery system after the first portion has been transmitted;
   wherein the second request corresponds to a request for playback of the recorded content.

8. The computer-implemented method of claim 1, wherein the dividing is based on a network performance measure, the network performance measure corresponding to information about characteristics of a streaming means used for streaming the second portion from the content delivery system to the CPE.

9. The computer-implemented method of claim 1, wherein the first portion and the second portion are transmitted over the same network.

10. The computer-implemented method of claim 1, wherein the second portion is streamed over the internet.

11. The computer-implemented method of claim 1, wherein the first portion is transmitted from the content delivery system to the CPE using a broadcast network implemented over broadcast transmission spectrum.

12. The computer-implemented method of claim 1, further comprising: storing the first portion at the CPE, and beginning playback of the locally stored first portion of the content at the CPE while the second portion of the content is streamed from the content delivery system to the CPE.

13. The computer-implemented method of claim 1, further comprising: preparing an index file for the content at the content delivery system, the index file for supporting trick play of the content; and transmitting the index file to the CPE prior to playback of the content.

14. The computer-implemented method of claim 1, wherein the request includes an indication of a recording conflict at the CPE, the recording conflict corresponding to an indication that the CPE has a conflict between multiple recording requests during the time the content to record is aired.

15. A system for recording linear content and delivering same for time-shifted viewing, comprising:

a storage, the storage having a recorded content, the recorded content corresponding to a recording of a linear content, and a first portion and a second portion of the recorded content;

a network interface; and a computer system, the computer system coupled in communication with the network interface and the storage, the computer system including a controller to record the linear content in response to a request from a customer premises equipment (CPE) received over the network interface, the recording occurring during time of transmission of the linear content;

determine the first portion and the second portion, the first portion being of sufficient duration to permit real time continuous playback of the recorded content on the CPE if the first portion has previously been transmitted to the CPE and the second portion has not previously been transmitted;

cause the first portion to be transmitted to the CPE over the network interface; and subsequently, responsive to receipt of a playback request from the CPE over the network interface, stream at least a portion of the second portion to the CPE over the network interface after playback of the recorded content has begun on the CPE.

16. The system of claim 15, wherein the network interface further comprises a first network interface and a second network interface, and wherein the transmitting of the first portion occurs via the first network interface and the streaming of at least a portion of the second portion occurs via the second network interface.

17. The computer-implemented system of claim 15, wherein the second network interface comprises the internet.

18. The computer-implemented system of claim 15, wherein the first network interface comprises a broadcast network implemented over broadcast transmission spectrum.

19. The computer-implemented system of claim 15, further comprising the controller to:

prepare an index file for the content at the content delivery system, the index file for supporting trick play of the content; and transmit the index file from the content delivery system to the CPE prior to the request for playback of the content.

20. A computer-implemented method of recording linear content and delivering same using a content delivery system and a customer premises equipment (CPE), comprising:

requesting recording of a linear content at the content delivery system from the CPE as a recorded content, the recording occurring during the time of transmission of the linear content;

dividing the recorded content at the CPE into at least a first portion and a second portion, the first portion of sufficient duration to permit real time continuous playback of the recorded content on the CPE if the first portion has previously been transmitted to the CPE and the second portion has not previously been transmitted;

requesting transmission of the first portion from the content delivery system to the CPE; and subsequent to receipt of the first portion, streaming and storing the second portion to the CPE from the content delivery system after playback of the recorded content has begun, wherein the playback is under control of the CPE from local storage.

21. A computer-implemented method of recording linear content and delivering same using a content delivery system, comprising:

recording a linear content at the content delivery system as a recorded content, the recording initiated in response to a request from a customer premises equipment (CPE) and the recording occurring during the time of transmission of the linear content;

dividing the recorded content at the content delivery system into at least a first portion and a second portion, the first portion of sufficient duration to permit real time continuous playback of the recorded content on the CPE if the first portion has previously been transmitted to the CPE and the second portion has not previously been transmitted;

transmitting the first portion from the content delivery system to the CPE; and subsequent to the transmitting, streaming the second portion to the CPE from the content delivery system after playback of the recorded content has begun, wherein the playback is under control of the CPE.

* * * * *